United States Patent
Singh et al.

(10) Patent No.: US 10,830,316 B2
(45) Date of Patent: Nov. 10, 2020

(54) TENSIONER

(71) Applicant: GATES CORPORATION, Denver, CO (US)

(72) Inventors: Sukhdeep Singh, Lasalle (CA); Sangkyu Kim, Milton (CA); Michael Koppeser, Windsor (CA)

(73) Assignee: Gates Corporation, Denver, CO (US)

( * ) Notice: Subject to any disclaimer, the term of this patent is extended or adjusted under 35 U.S.C. 154(b) by 331 days.

(21) Appl. No.: 15/835,967

(22) Filed: Dec. 8, 2017

(65) Prior Publication Data

US 2019/0178353 A1 Jun. 13, 2019

(51) Int. Cl.
*F16H 7/10* (2006.01)
*F16H 7/12* (2006.01)
*F16H 7/08* (2006.01)

(52) U.S. Cl.
CPC ............. *F16H 7/10* (2013.01); *F16H 7/0829* (2013.01); *F16H 7/1263* (2013.01); *F16H 7/1281* (2013.01); *F16H 2007/0806* (2013.01); *F16H 2007/0842* (2013.01); *F16H 2007/0865* (2013.01); *F16H 2007/0874* (2013.01); *F16H 2007/0891* (2013.01); *F16H 2007/0893* (2013.01)

(58) Field of Classification Search
CPC ........... F16H 2007/0874; F16H 7/1281; F16H 2007/0806; F16H 2007/0808; F02B 67/06
USPC .................................................. 474/135, 137
See application file for complete search history.

(56) References Cited

U.S. PATENT DOCUMENTS

| | | | | |
|---|---|---|---|---|
| 1,571,153 A | * | 1/1926 | Wright | F16H 7/1263 474/58 |
| 1,581,624 A | * | 4/1926 | Wunderlich | F02B 67/06 474/87 |
| 1,582,516 A | * | 4/1926 | Gibson | F16H 7/1263 474/137 |
| 1,971,551 A | * | 8/1934 | Curtiss | F16H 7/1281 474/137 |
| 2,012,399 A | * | 8/1935 | Molinelli | B66C 23/84 474/137 |
| 2,832,358 A | * | 4/1958 | Chambers | A45D 8/34 132/273 |
| 3,473,399 A | * | 10/1969 | Buchwald | F02B 67/06 474/87 |

(Continued)

FOREIGN PATENT DOCUMENTS

| FR | 2832358 A1 | 5/2003 |
|---|---|---|
| JP | 02275160 A | 11/1990 |

(Continued)

OTHER PUBLICATIONS

European Patent Office, International Search Report and Written Opinion of the International Searching Authority, International application No. PCT/US2018/064463, dated Feb. 27, 2019.

*Primary Examiner* — Henry Y Liu

(74) *Attorney, Agent, or Firm* — Paul N. Dunlap, Esq.

(57) ABSTRACT

A tensioner comprising a carrier pivotably mountable to a mounting surface, an arm having a first pulley journalled thereto and a second pulley journalled thereto, the arm slidingly engaged with the carrier for a linear movement with respect to a carrier axis A-A, and a spring disposed between the carrier and the arm, the spring resisting an arm movement along carrier axis A-A.

12 Claims, 5 Drawing Sheets

(56) References Cited

U.S. PATENT DOCUMENTS

| | | | | |
|---|---|---|---|---|
| 3,496,918 A * | 2/1970 | Finlay | F01L 1/348 | 123/90.15 |
| 3,580,094 A * | 5/1971 | Kraus | F16H 7/1254 | 474/28 |
| 3,888,217 A * | 6/1975 | Hisserich | F01L 1/024 | 123/90.31 |
| 3,926,063 A * | 12/1975 | Mayfield | F16H 7/1254 | 474/132 |
| 4,068,535 A * | 1/1978 | Sheets | F16H 7/1254 | 474/132 |
| 4,416,647 A * | 11/1983 | White, Jr. | F16H 7/1281 | 474/134 |
| 4,424,873 A * | 1/1984 | Terlaak | A61G 5/045 | 180/65.1 |
| 4,571,223 A * | 2/1986 | Molloy | F16H 7/1281 | 474/112 |
| 4,934,989 A * | 6/1990 | Furukawa | F16H 7/1281 | 474/135 |
| 5,000,724 A * | 3/1991 | Reid | F16H 7/08 | 474/111 |
| 5,002,518 A * | 3/1991 | Pennatto | F16H 7/10 | 474/113 |
| 5,277,666 A * | 1/1994 | Kumm | F16H 7/1236 | 474/133 |
| 5,776,025 A * | 7/1998 | Labudde | F16H 7/1281 | 474/133 |
| 5,938,551 A * | 8/1999 | Warner | F16H 7/1263 | 474/111 |
| 6,086,036 A * | 7/2000 | Santa Cruz | F16H 7/1263 | 248/674 |
| 6,506,137 B2 * | 1/2003 | Guhr | F02B 67/06 | 474/134 |
| 6,689,001 B2 * | 2/2004 | Oliver | F16H 7/1281 | 474/134 |
| 6,830,524 B2 * | 12/2004 | Tamai | F16H 7/1281 | 474/111 |
| 6,857,978 B2 * | 2/2005 | Polster | F16H 7/1209 | 474/134 |
| 6,942,589 B2 * | 9/2005 | Rogers | F16H 7/12 | 474/134 |
| 6,960,145 B2 * | 11/2005 | Fraley, Jr. | B62D 5/0424 | 180/444 |
| 7,419,447 B2 * | 9/2008 | Serkh | F16H 7/1218 | 474/117 |
| 7,494,434 B2 * | 2/2009 | McVicar | F16H 7/1281 | 474/101 |
| 7,530,911 B2 * | 5/2009 | Serkh | F16H 7/1218 | 474/133 |
| 7,682,272 B2 * | 3/2010 | Park | H02K 15/165 | 474/137 |
| 7,824,286 B2 * | 11/2010 | Schmid | F16H 7/1263 | 411/546 |
| 7,896,765 B2 * | 3/2011 | Kuo | F16H 7/1281 | 474/134 |
| 7,901,310 B2 * | 3/2011 | Lolli | F16H 7/1281 | 474/134 |
| 8,057,334 B2 * | 11/2011 | Kotzur | F16H 7/1281 | 474/133 |
| 8,353,795 B2 * | 1/2013 | Montani | F02B 67/06 | 474/134 |
| 8,439,780 B2 * | 5/2013 | Ruffini | F16H 7/1281 | 474/112 |
| 9,133,762 B2 * | 9/2015 | Maguire | F02B 67/06 | |
| 9,651,122 B2 * | 5/2017 | Harvey | F02N 15/08 | |
| 2003/0224889 A1 * | 12/2003 | Luh | F16H 7/1281 | 474/134 |
| 2006/0283912 A1 * | 12/2006 | Eberach | H01R 43/0207 | 228/101 |
| 2008/0214342 A1 * | 9/2008 | Montani | F02B 67/06 | 474/134 |
| 2015/0051033 A1 * | 2/2015 | Replete | F16H 7/08 | 474/117 |

FOREIGN PATENT DOCUMENTS

| | | |
|---|---|---|
| JP | 2006283912 A | 10/2006 |
| WO | 2016098051 A1 | 6/2016 |

* cited by examiner

TENSIONER

FIELD OF THE INVENTION

The invention relates to a tensioner, and more particularly, to a tensioner having a pivotal carrier and an arm having a linear sliding engagement therewith, the arm having two pulleys.

BACKGROUND OF THE INVENTION

Most internal combustion engines comprise accessories such as power steering, an alternator and air conditioning to name a few. These accessories are typically driven by a belt. A tensioner is typically used to apply a preload to the belt in order to prevent slippage. The tensioner can be mounted to an engine mounting surface The engine may further comprise a start-stop system whereby the engine will shut down when the vehicle is not in motion, and when a driver command is received to proceed the engine will restart.

The start-stop function will tend to reverse loading on the belt. Hence, tensioners are available to accommodate belt load reversals. The tensioner may comprise one or more components which independently pivot in order to properly apply a required belt preload force in both belt drive directions. The tensioner may also be mounted directly to an accessory such as a motor generator unit in order to save space in the engine bay.

Representative of the art is U.S. Pat. No. 6,942,589 which discloses a method and system for a tensioner for an endless power transmission belt in an engine. The method and system comprise an AGS pulley and crankshaft pulley coupled to the belt, one of the AGS pulley or the crankshaft pulley operating as a driving pulley that drives the belt so that a tight span and slack span are created in the belt on opposite sides of the driving pulley. The method and system also comprise accessory pulleys coupled to the belt. The tensioner comprises first and second arms, each arm rotatably coupled to a pulley, the pulleys being positioned such that a first one of the pulleys is coupled to the tight span and a second one of the pulleys is coupled to the slack span.

What is needed is a tensioner having a pivotal carrier and an arm having a linear sliding engagement therewith, the arm having two pulleys for engaging a belt. The present invention meets this need.

SUMMARY OF THE INVENTION

The primary aspect of the invention is to provide a tensioner having a pivotal carrier and an arm having a linear sliding engagement therewith, the arm having two pulleys for engaging a belt.

Other aspects of the invention will be pointed out or made obvious by the following description of the invention and the accompanying drawings.

The invention comprises a tensioner comprising a carrier pivotably mountable to a mounting surface, an arm having a first pulley journalled thereto and a second pulley journalled thereto, the arm slidingly engaged with the carrier for a linear movement with respect to a carrier axis A-A, and a spring disposed between the carrier and the arm, the spring resisting an arm movement along carrier axis A-A.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
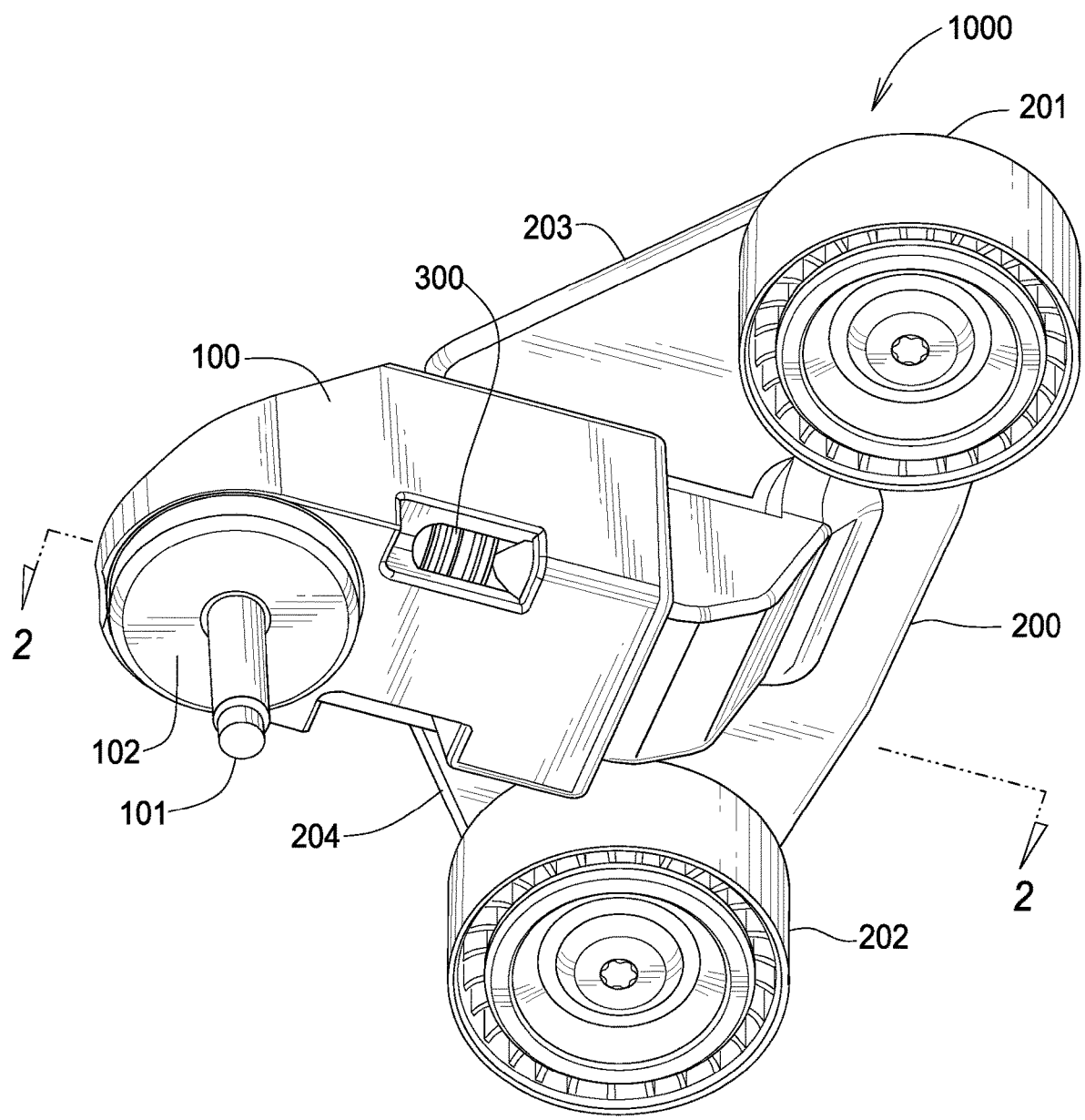
FIG. 1 is a perspective view of the tensioner.

FIG. 1 is a perspective view of the tensioner. Tensioner 1000 comprises a carrier 100 pivotally mounted to a mounting surface by a fastener 101. Carrier 100 pivots about fastener 101 on a base 102. Base 102 is disposed between the carrier and the mounting surface.

Arm 200 slidingly engages in an axial direction receiver 103 within carrier 100. In compression spring 300 applies a spring load to arm 200. Arm 200 is rigid and is not flexible for the purposes of the invention. In response to the spring action, arm 200 through two pulleys journalled thereto applies a load to a belt B, see FIG. 6.

Pulley 201 is journalled to a first portion 203 of arm 200. Pulley 202 is journalled to a second portion 204 of arm 200. Portion 203 extends in a direction opposite portion 204 with respect to carrier 100 axis A-A. Pulley 201 and pulley 202 are coplanar. This tends to balance hub loads as seen by each pulley with respect to the fastener 101 when the tensioner is in operation. Carrier 100 automatically pivots about fastener 101 in response to changes in the pulley hub loads, hence a combined vector of the respective hub loads acts through the major axis of fastener 101. This in turn prevents carrier 100 from binding when in operation.

Figure 2:
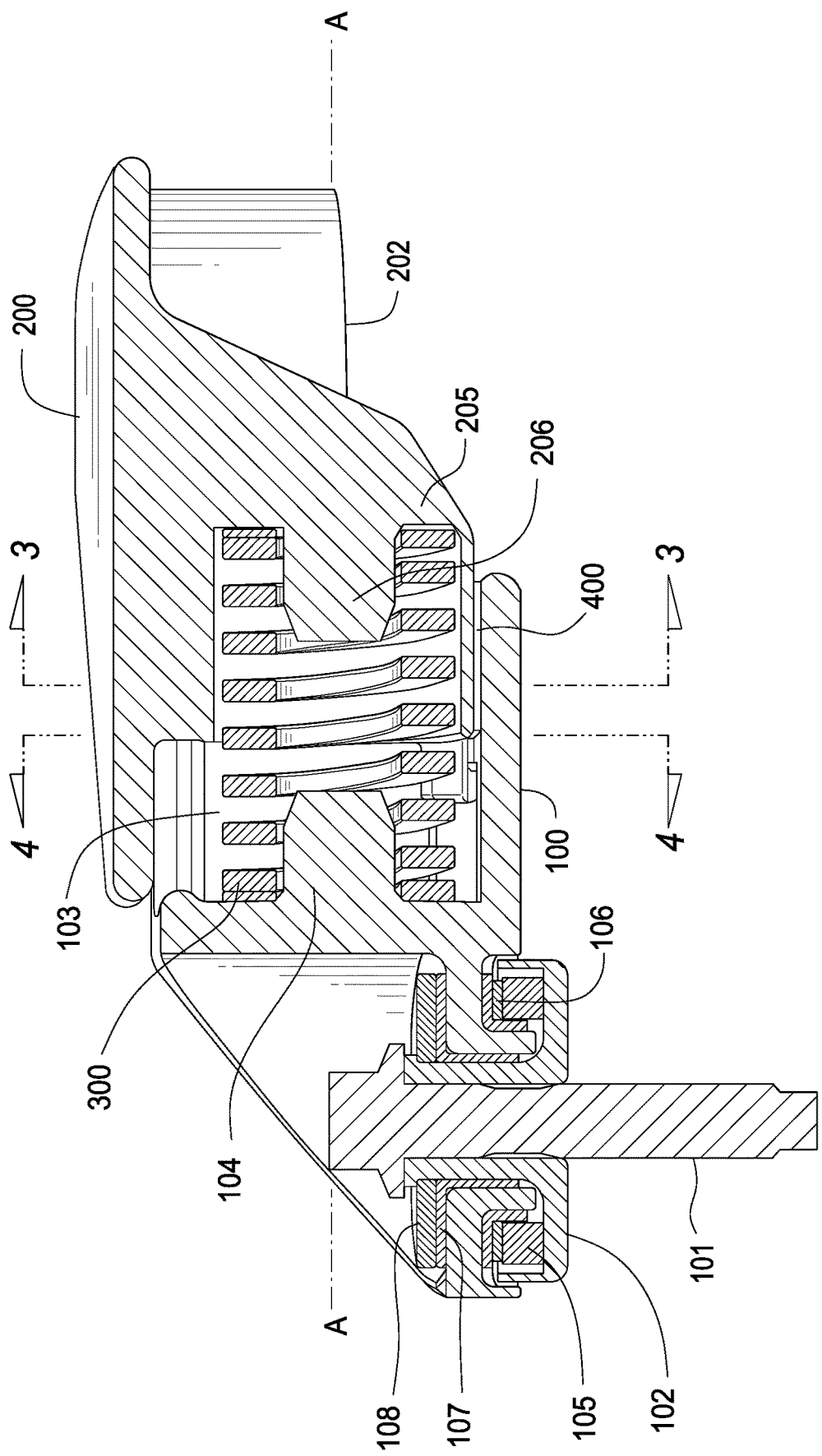
FIG. 2 is a cross-sectional view of the tensioner at 2-2.

FIG. 2 is a cross-sectional view of the tensioner at 2-2. Spring engaging portion 205 and arm 200 comprise plastic, metal or any other suitable material known in the art. Portion 205 of arm 200 cooperatively engages receiver 103 in a sliding manner along axis A-A. In this embodiment portion 205 and receiver 103 are rectangular in cross-section, but may also comprise any other suitable geometric cross-sectional form as may be required by a user.

Bushing 400 is disposed between portion 205 and receiver 103. Bushing 400 comprises any suitable material capable of damping an axial oscillatory movement of portion 205 within receiver 103 along a linear axis A-A. Spring 300 is disposed and retained between protrusion 104 and protrusion 206. Protrusion 104 and protrusion 206 extend along axis A-A. Spring 300 is a coil spring and is circular in cross-section. Spring 300 is retained in portion 205 and receiver 103.

Figure 3:
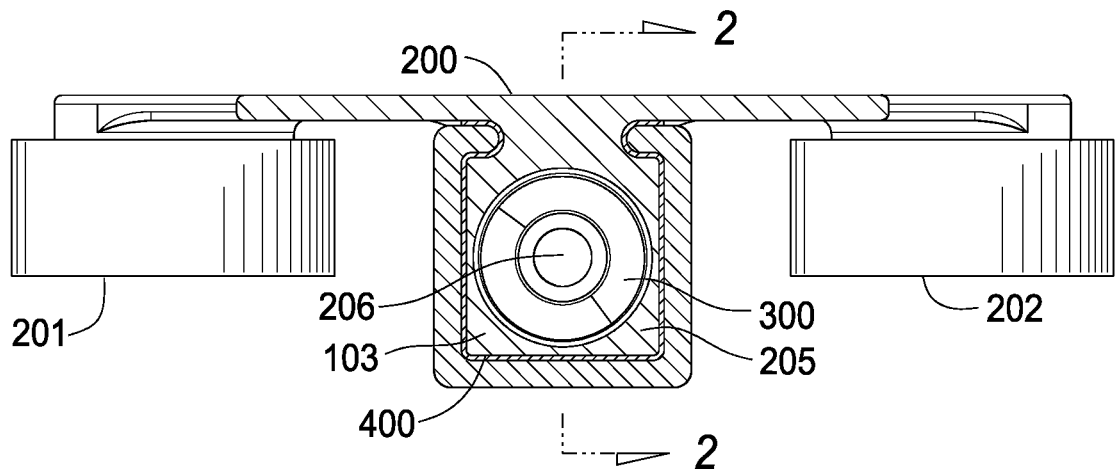
FIG. 3 is a cross-sectional view of the tensioner at 3-3.

FIG. 3 is a cross-sectional view of the tensioner at 3-3. Pulley 201 and 202 engage a belt and as such are coplanar. Bushing 400 allows a sliding movement between portion 205 and receiver 103. The plane containing each pulley 201, 202 also includes spring 300. More particularly, axis A-A is included in the plane occupied by the pulleys 201 and 202 as well as spring 300.

Figure 4:
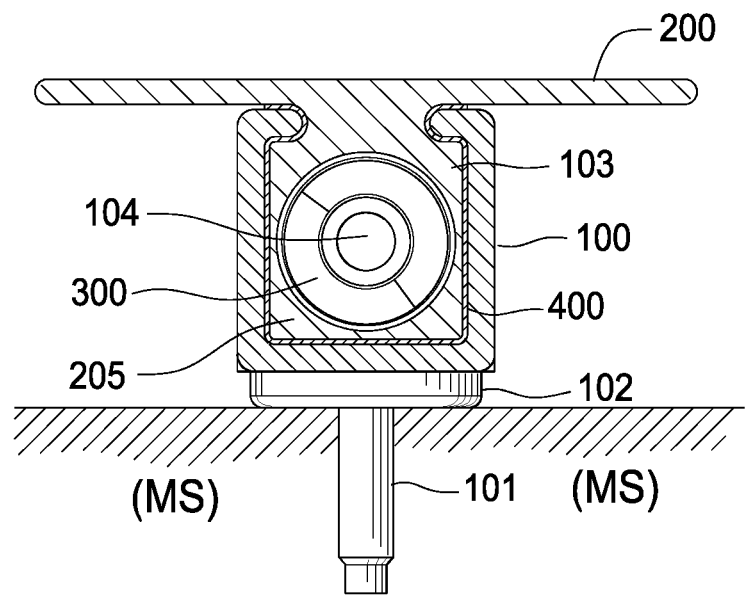
FIG. 4 is a cross-sectional view of the tensioner at 4-4.

FIG. 4 is a cross-sectional view of the tensioner at 4-4. Protrusion 104 engages an end of spring 300. Portion 205 slidingly engages receiver 103 within bushing 400.

Carrier 100 is pivotally engaged with a mounting surface (MS) on base 102 with a fastener 101. Fastener 101 can be threaded or press fit in to the mounting surface. In this embodiment, mounting surface MS comprises a belt driven machine (BDM), see FIG. 6. Axis A-A intersects the axis extending through fastener 101 and thereby through the pivot axis of the carrier about fastener 101.

Figure 5:
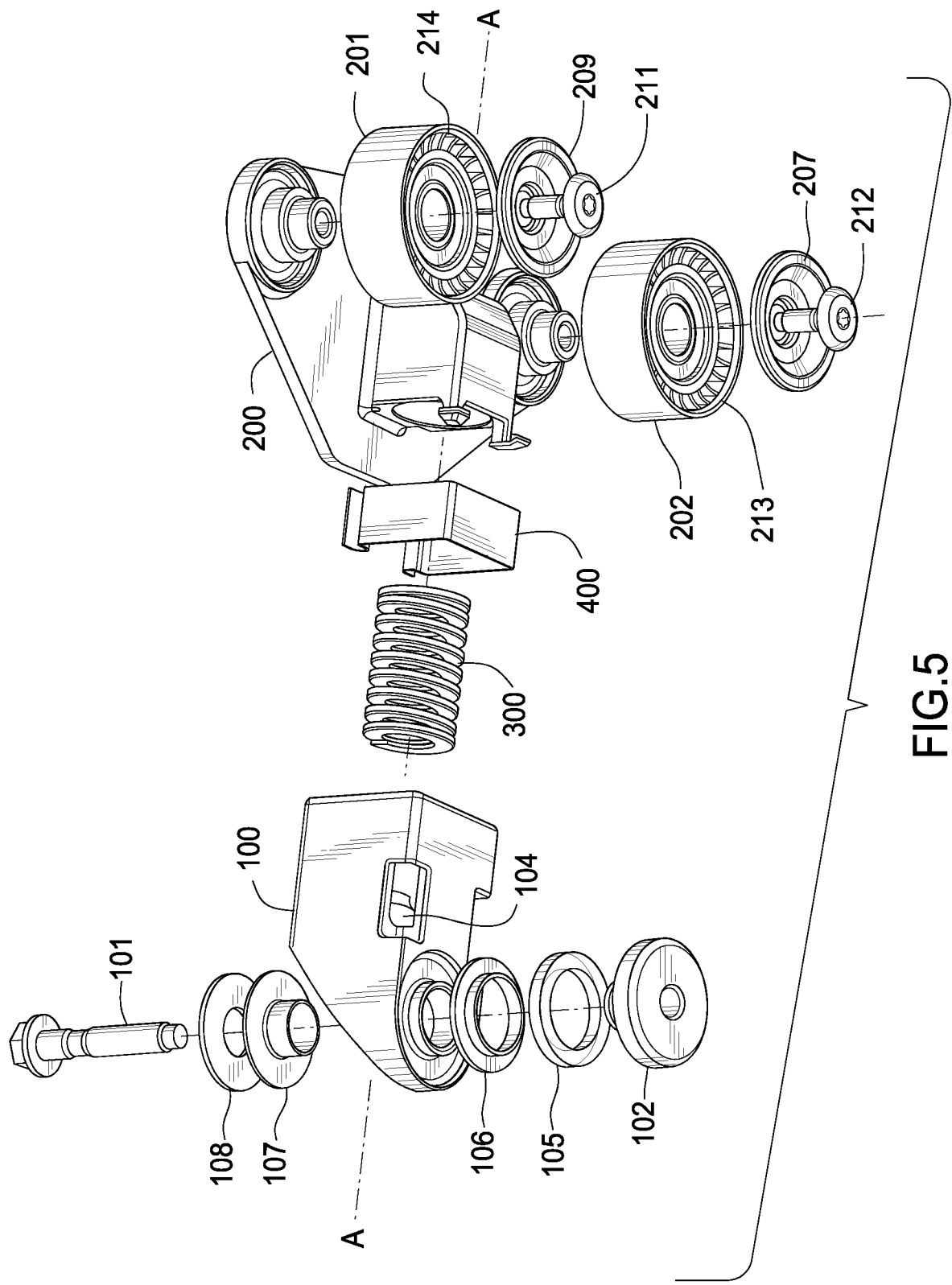
FIG. 5 is an exploded view of the tensioner.

FIG. 5 is an exploded view of the tensioner. Arm 200 moves in a linear manner along axis A-A. The form of portion 205 prevents any relative "wobble" or side to side movement of portion 205 relative to receiver 103.

Dust covers 207, 209 prevent debris from entering bearing 213 and 214 respectively.

Carrier 100 pivots about fastener 101 in response to a belt movement. Washer 108 is staked to base 102 in order to retain bushing 107 and thereby carrier 100 to base 102. Other methods of attachment may be used as well such as threaded, press fit or snap fit. Damping member 105 is disposed between base 102 and bushing 106. Damping member 105 damps a pivotal oscillation of carrier 100 about fastener 101. Spring 300 is loaded in compression.

Busing 400 prevents direct contact between portion 205 and receiver 103.

Figure 6:
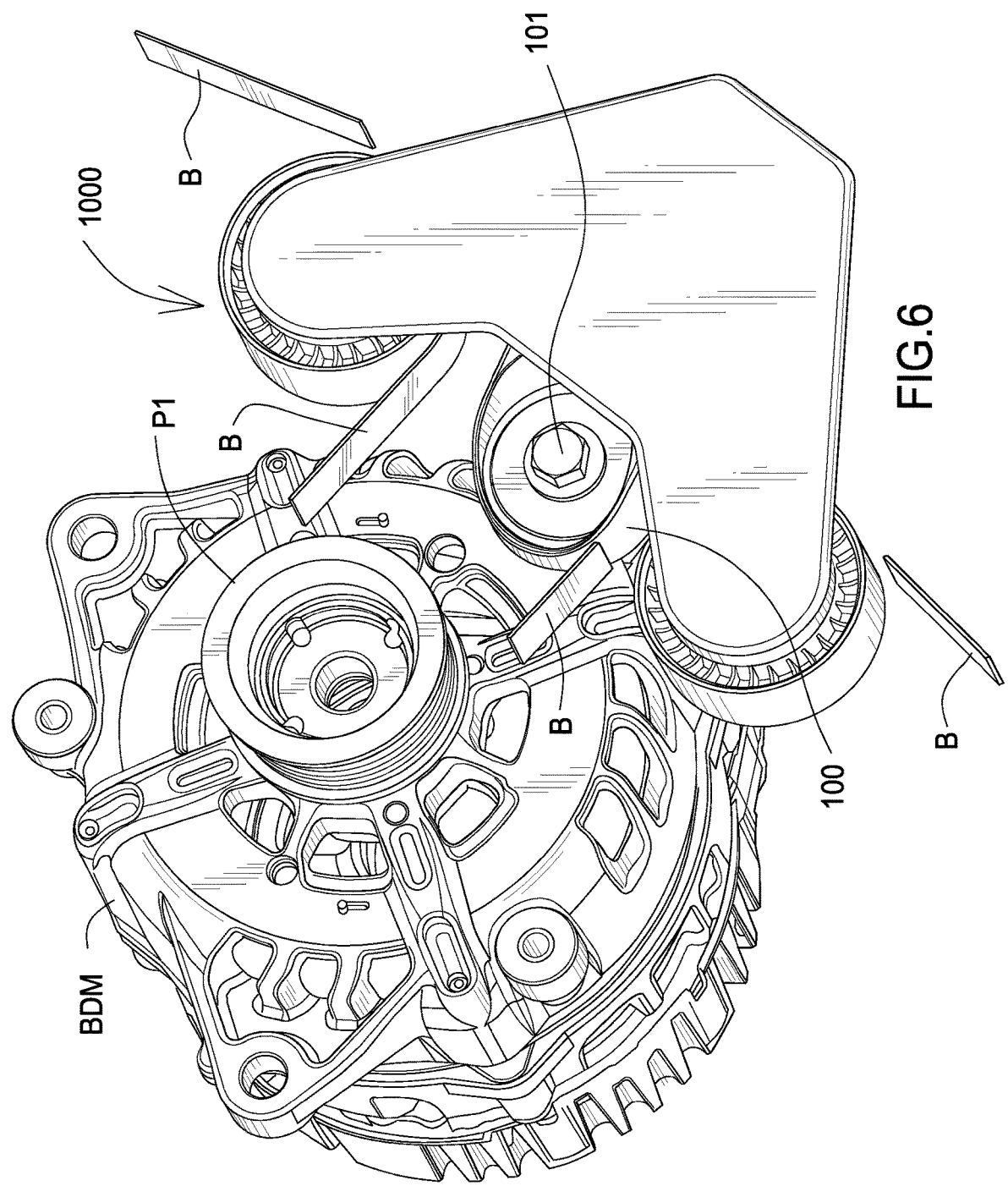
FIG. 6 is a front view of the tensioner installed on a belt driven machine.

FIG. 6 is a front view of the tensioner installed on a belt driven machine. Tensioner 1000 is mounted to a belt driven machine with fastener 101. A belt B engages pulley 201 and 202. Belt B also engages pulley P1 which then drives the BDM. The BDM may be an engine component which supports start-stop operation, for example, a starter generator.

Sliding movement of arm 200 along axis A-A controls a belt tension during engine operation either when the BDM is operated in a start mode as a starter, or, when the BDM is operating as a generator or alternator. The tight and slack side of the belt changes depending on the operating mode of the BDM. Movement of arm 200 simultaneous with pivotal movement of carrier 100 accommodates changes in belt tension, which in turn controls belt tension behavior. Control of belt tension extends belt life and reduces belt noise as the BDM changes operating modes from starter to generation.

Although a form of the invention has been described herein, it will be obvious to those skilled in the art that variations may be made in the construction and relation of parts and method without departing from the spirit and scope of the invention described herein.

We claim:

1. A tensioner comprising:
    a carrier pivotably mountable to a mounting surface;
    an arm having a first pulley journalled thereto and a second pulley journalled thereto;
    the arm slidingly engaged within the carrier for a linear movement with respect to a carrier axis A-A; and
    a spring disposed between the carrier and the arm, the spring resisting an arm movement along carrier axis A-A.

2. The tensioner as in claim 1, wherein the first pulley and the second pulley are opposite each other with respect to carrier axis A-A.

3. The tensioner as in claim 1, wherein the spring is a compression spring.

4. The tensioner as in claim 1, wherein the mounting surface is on a belt driven machine.

5. The tensioner as in claim 1 further comprising a damping member disposed between the carrier and a base to damp a pivotal movement of the carrier.

6. The tensioner as in claim 1, wherein axis A-A intersects an axis extending through a pivot axis of the carrier.

7. The tensioner as in claim 6, wherein the pivot axis of the carrier extends through a fastener.

8. The tensioner as in claim 1, wherein the arm is slidingly engaged in a receiver within the carrier for the linear movement with respect to carrier axis A-A.

9. The tensioner as in claim 1, further comprising a receiver within the carrier, and wherein (i) the arm includes a spring engaging portion, (ii) the receiver and the spring engaging portion retain the spring, and (iii) the spring engaging portion slidingly engages with the receiver for the linear movement with respect to carrier axis A-A.

10. The tensioner as in claim 9, further comprising a bushing disposed between the spring engaging portion and the receiver, and wherein the spring engaging portion slidingly engages the receiver within the bushing.

11. The tensioner as in claim 1, wherein (i) the mounting surface is on a belt driven machine, and (ii) the carrier is pivotably mountable to the belt driven machine mounting surface via a fastener rotationally fixable to the belt driven machine mounting surface.

12. The tensioner as in claim 1, wherein (i) the carrier includes a carrier protrusion extending into the spring and axially along carrier axis A-A, (ii) the arm includes an arm protrusion extending into the spring and axially along carrier axis A-A, and (iii) the spring is retained between the carrier protrusion and the arm protrusion.

\* \* \* \* \*